Feb. 13, 1934.  A. I. BABENDREER ET AL  1,946,473
APPARATUS FOR INTRODUCING LUBRICATING OIL INTO GASOLINE
Filed Dec. 1, 1932
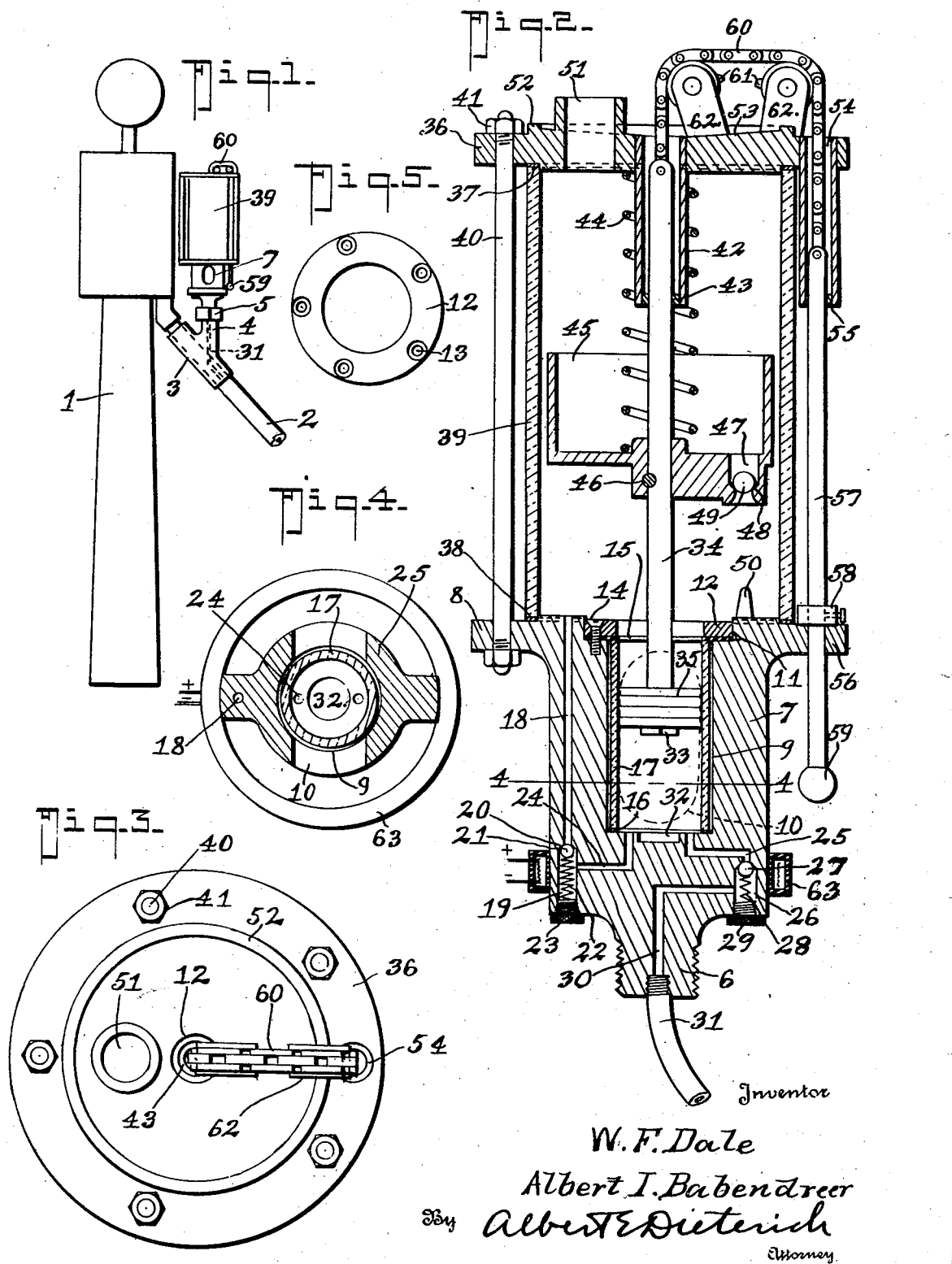
Inventor
W. F. Dale
Albert I. Babendreer
By Albert E. Dieterich
Attorney Patented Feb. 13, 1934

1,946,473

UNITED STATES PATENT OFFICE 1,946,473

APPARATUS FOR INTRODUCING LUBRICATING OIL INTO GASOLINE

Albert I. Babendreer and William F. Dale, Ocean Springs, Miss.

Application December 1, 1932. Serial No. 645,293

19 Claims. (Cl. 221—103)

Our invention has been designed for the purpose of introducing a predetermined quantity of lubricating oil into a definite quantity of gasoline issuing from the filling tower of a gasoline station.

It particularly has for its object to provide an apparatus which, while of an inexpensive construction, will nevertheless effectively and accurately serve its intended purposes.

Generically the invention has for an object to provide a base and a cap between which a glass cylinder is held in fluid-tight relation to serve as a reservoir for the oil, the base having a measuring cylinder and a piston operating therein for drawing oil from the reservoir and delivering it in measured quantities to the discharge line from the gasoline dispensing tower, provisions being made for mounting the apparatus on the tower discharge neck.

Further, it is an object of the invention to provide the base casting with the necessary ducts and back-check valves from the reservoir to the dispensing cylinder and from the dispensing cylinder to the outlet tube of the apparatus which is located within the discharge line of the filling tower, and to provide means to heat the base casting around the valves and measuring cylinders in cold weather to keep the oil fluent so as to pass through said ducts and valves.

Further, it is an object to provide the base castings with windows or sight-openings whereby the measuring cylinder may become visible. Again, it is an object to provide means within the reservoir for forcing the measuring piston down, means mounted on the cap and base casting for pulling the measuring piston up a definite distance in order to supply the measuring cylinder with oil from the reservoir, and means effected by the movement of the measuring pistons' rod for circulating the oil within the reservoir to agitate it without aerating it.

Further, it is an object to provide means to retain a reserve amount of oil in the reservoir, at least equal to one filling of the measuring cylinder after the oil level has fallen in the reservoir below the bottom thereof, which reserve quantity will be released when the measuring and dispensing piston reaches the limit of its downstroke.

Further, it is an object to provide means to trap any oil that may be dragged out of the reservoir by means of the link belt connection between the piston rod and the setting rod of the apparatus and return such oil to the reservoir.

Other objects will in part be obvious and in part be pointed out hereinafter.

To the attainment of the aforesaid objects and ends, the invention still further resides in the novel details of construction, combination and arrangement of parts, all of which will be first fully described in the following detailed description, then be particularly pointed out in the appended claims, reference being had to the accompanying drawing in which:—

Figure 1 is a diagrammatic elevation of the gasoline tower with our invention attached.

Figure 2 is a vertical, longitudinal section of the invention.

Figure 3 is a plan thereof.

Figure 4 is a horizontal cross section on the line 4—4 of Figure 2.

Figure 5 is a plan of the washer which holds the measuring cylinder in place.

In the drawing in which like numerals of reference designate like parts in all of the figures, 1 represents a conventional gasoline filling tower, 2 the dispensing hose thereof and 3 a fitting union secured to the outlet neck of the tower and to which the hose 2 is secured. The fitting 3 has a neck 4 to which the neck 6 of the base casting 7 of our apparatus is joined by a union or coupling nut 5.

The base casting 7 of our apparatus has a flange 8 provided with holes for the bolts or threaded rods 40 hereinafter again referred to and with a hole 56 to serve as a guide for the setting rod 57 also hereinafter again referred to.

The base casting 7 is provided with a vertical chamber 9 and sight openings 10. It is also provided with a recess 11 in which the washer 12 is secured by screws 14 passing through holes 13 in the washer, the washer 12 serving to hold the measuring cylinder 17 and the gaskets 15 and 16 in place.

18 is a duct from the reservoir to a valve chamber 19 having a valve seat 20 and in which is a suitable valve 21 and valve spring 22, the valve chamber being closed by a screw plug 23.

From the valve chamber 19 a duct 24 conveys the oil into the measuring cylinder 17, the oil being conveyed from the measuring cylinder 17 through a duct 25 to a second valve chamber 26 in which is a second valve 27, valve spring 28 and screw closure plug 29. From the valve chamber 26 the oil is passed through a duct 30 to a tube 31 which is inserted into the union 3 and has its outlet end directed to deliver into the gasoline stream passing through the fitting 3 to the dispensing hose 2.

The base 7 has a recess 32 to receive the nut 33 on the end of the piston rod 34 which carries the dispensing piston 35. The rod 34 projects up into the oil reservoir. The oil reservoir is composed of the base 7, the cap 36 and the cylinder 39 which is located between the base and the cap and is held in fluid-tight contact therewith by means of screw rods 40, nuts 41 and interposed gaskets 37 and 38.

42 is an inner central channel sleeve secured in an aperture in the cap 36 and provided with a bushing 43 through which the piston rod 34 passes. A spring 44 encircles the sleeve 42, engages the cap 36 and is connected with the rod 34 to force it downwardly. The connection of the spring to the rod 34 may be effected by engaging the lower end of the spring with the bottom of a displacement cup 45 that is pinned at 46 to the rod 34 and is located within the oil reservoir.

The displacement cup 45 has a valve passage 47 in its bottom, the same being provided with a valve seat 48 and a one-way valve 49, the latter being lifted from its seat by the positive action of the pin 50 on the casting 7 when the cup 45 is at its lowermost position.

51 designates a filling opening in the cap 36 and 52 is an annular flange on the top of the cap which encircles a depression 53 that serves to collect any oil that may be drawn up through the sleeve 42 and return it to the reservoir side of that sleeve.

54 is an outer channel sleeve carried by the cap 36 and provided with a bushing 55 through which the setting rod 57 passes. The rod 57 is provided with a collar and set screw 58 that can be secured at any position along the rod and serves as a gauge to limit the movement of the piston 35 upwardly. The rod 57 at its lower end has a ball handle 59 by means of which it may be conveniently manipulated. The upper end of the rod 57 is connected by a link belt, or chain, 60 with the upper end of the piston rod 34, the link belt, or chain, 60 passing over pulleys or sprockets 61 on supports 62 carried by the cap 36.

In order that the oil in cold weather may be kept fluent where it flows through the base casting 7 we provide an electric heater 63 on the base 7 located preferably adjacent the valve chambers. This heater is designed to warm up the base casting enough to keep the ducts and valve chambers with which the piston 35 co-operates open to the passage of oil.

In using our invention the reservoir of the cylinder 39 is filled with oil and the collar 58 is set to limit the upper movement of the piston 35 to the desired degree for a certain quantity of oil. The operator then pulls down on the handle 59 until the collar 58 engages the flange 8. This elevates the piston 35 and the displacement cup 45 and causes oil to be drawn from the reservoir into the measuring cylinder 17. As the piston rod 34 rises the valve 49 will remain closed and consequently the cup 45 will displace upwardly the oil column above it and thereby cause the oil to flow down along the inner face of the cylinder 39 to occupy the space below the cup 45. Upon letting go of the handle 59 the spring 44, together with gravity, will force the piston 35 downwardly and expel the oil from the cylinder 17 via ducts 25, 30 and 31 into the gasoline 2, the spring 44 being of sufficient tension to overcome any back pressure from the gasoline line, making regurgitation impossible. Thus on the up-stroke of the cup oil flows down the wall of the cylinder; on the down-stroke of the cup, however, the reverse action—in a degree—takes place, the valve 49 opening to relieve pressure as well as to assist in the agitation of the oil.

As the cup 45 reaches the lower limit of its movement the pin 50 will hold the valve 49 unseated to allow any oil that is in the cup 45 to drain out in the event that the oil level in the cylinder 39 has fallen below the level of the cup 45.

The cup 45 is preferably designed to hold at least one complete charge of the measuring cylinder 17 and thus serves as a reserve reservoir to that extent.

While our invention has been primarily designed for serving a definite quantity of oil to the gasoline being dispensed from the gasoline tower, it is obvious that it may also be used for dispensing other fluids to that gasoline, as—for instance—"anti-knock" fluid if desired.

From the foregoing description, taken in connection with the accompanying drawing, it is thought that the complete construction, combination, arrangement and advantages of our invention will be clear to those skilled in the art.

What we claim is:

1. In an apparatus of the character described, a base, a reservoir for liquid carried by the base, means within the base and reservoir for dispensing measured quantities of liquid via the base, said dispensing means including a measuring cylinder and a piston, a piston rod, mechanical means to force the piston to expel a measured charge from the measuring cylinder and manual means to operate the piston for supplying the measuring cylinder with liquid from the reservoir.

2. In an apparatus of the character described, a base, a reservoir for liquid carried by the base, means within the base and reservoir for dispensing measured quantities of liquid via the base, said dispensing means including a measuring cylinder and a piston, a piston rod, mechanical means to force the piston to expel a measured charge from the measuring cylinder, manual means to operate the piston for supplying the measuring cylinder with liquid from the reservoir and means within the reservoir and actuated by movements of the piston rod for displacing liquid and causing it to flow within the reservoir for purposes described.

3. In an apparatus of the character described, a base, a reservoir for liquid carried by the base, means within the base and reservoir for dispensing measured quantities of liquid via the base, said dispensing means including a measuring cylinder and a piston, a piston rod, mechanical means to force the piston to expel a measured charge from the measuring cylinder, manual means to operate the piston for supplying the measuring cylinder with liquid from the reservoir and a cup on the piston rod within the reservoir for the purposes described.

4. In an apparatus of the character described, a base, a reservoir for liquid carried by the base, means within the base and reservoir for dispensing measured quantities of liquid via the base, said dispensing means including a measuring cylinder and a piston, a piston rod, mechanical means to force the piston to expel a measured charge from the measuring cylinder, manual means to operate the piston for supplying the measuring cylinder with liquid from the reservoir and a displacement cup on the piston rod within the reservoir, said cup having a valve outlet in its bottom.

5. In an apparatus of the character described, a base, a reservoir for liquid carried by the base, means within the base and reservoir for dispensing measured quantities of liquid via the base, said dispensing means including a measuring cylinder and a piston, a piston rod, mechanical means to force the piston to expel a measured charge from the measuring cylinder, manual means to operate the piston for supplying the measuring cylinder with liquid from the reservoir, a displacement cup on the piston rod within the reservoir, said cup having a valve outlet in its bottom, and means positively to open said outlet on the down-stroke of said piston rod.

6. In an apparatus of the character stated, a base having a chamber, a measuring cylinder secured in said chamber, a cap, a reservoir cylinder mounted between the base and cap, said cap having an opening provided with a central channel sleeve, a piston rod operable in said sleeve, a piston within said measuring cylinder and on said rod, said base having a duct from the reservoir to the measuring cylinder and an outlet duct from the measuring cylinder, back check valves in said ducts, means passing through said sleeve by which the piston may be elevated to supply the measuring cylinder with liquid from the reservoir, and means for forcing the piston downwardly to expel the fluid from the measuring cylinder.

7. In an apparatus of the character stated, a base having a chamber, a measuring cylinder secured in said chamber, a cap, a reservoir cylinder mounted between the base and cap, said cap having an opening provided with a central channel sleeve, a piston rod operable in said sleeve, a piston within said measuring cylinder and on said rod, said base having a duct from the reservoir to the measuring cylinder and an outlet duct from the measuring cylinder, back check valves in said ducts, means passing through said sleeve by which the piston may be elevated to supply the measuring cylinder with liquid from the reservoir, and means for forcing the piston downwardly to expel the fluid from the measuring cylinder, said forcing means comprising a spring engaging said cap and connected with said piston rod.

8. In an apparatus of the character stated, a base having a chamber, a measuring cylinder secured in said chamber, a cap, a reservoir cylinder mounted between the base and cap, said cap having an opening provided with a central channel sleeve, a piston rod operable in said sleeve, a piston within said measuring cylinder and on said rod, said base having a duct from the reservoir to the measuring cylinder and an outlet duct from the measuring cylinder, back check valves in said ducts, means passing through said sleeve by which the piston may be elevated to supply the measuring cylinder with liquid from the reservoir, means for forcing the piston downwardly to expel the fluid from the measuring cylinder and an electric heater carried by said base to heat the contents of said ducts and said measuring cylinder.

9. In an apparatus of the character stated, a base having a chamber, a measuring cylinder secured in said chamber, a cap, a reservoir cylinder mounted between the base and cap, said cap having an opening provided with a central channel sleeve, a piston rod operable in said sleeve, a piston within said measuring cylinder and on said rod, said base having a duct from the reservoir to the measuring cylinder and an outlet duct from the measuring cylinder, back check valves in said ducts, means passing through said sleeve by which the piston may be elevated to supply the measuring cylinder with liquid from the reservoir, means for forcing the piston downwardly to expel the fluid from the measuring cylinder, said forcing means comprising a spring engaging said cap and connected with said piston rod and an electric heater carried by said base to heat the contents of said ducts and said measuring cylinder.

10. In an apparatus of the character stated, a base having a chamber, a measuring cylinder secured in said chamber, a cap, a reservoir cylinder mounted between the base and cap, said cap having an opening provided with a central channel sleeve, a piston rod operable in said sleeve, a piston within said measuring cylinder and on said rod, said base having a duct from the reservoir to the measuring cylinder and an outlet duct from the measuring cylinder, back check valves in said ducts, means passing through said sleeve by which the piston may be elevated to supply the measuring cylinder with liquid from the reservoir, means for forcing the piston downwardly to expel the fluid from the measuring cylinder and a displacement cup on said piston rod within the reservoir.

11. In an apparatus of the character stated, a base having a chamber, a measuring cylinder secured in said chamber, a cap, a reservoir cylinder mounted between the base and cap, said cap having an opening provided with a central channel sleeve, a piston rod operable in said sleeve, a piston within said measuring cylinder and on said rod, said base having a duct from the reservoir to the measuring cylinder and an outlet duct from the measuring cylinder, back check valves in said ducts, means passing through said sleeve by which the piston may be elevated to supply the measuring cylinder with liquid from the reservoir, means for forcing the piston downwardly to expel the fluid from the measuring cylinder, said forcing means comprising a spring engaging said cap and connected with said piston rod and a displacement cup on said piston rod within the reservoir.

12. In an apparatus of the character stated, a base having a chamber, a measuring cylinder secured in said chamber, a cap, a reservoir cylinder mounted between the base and cap, said cap having an opening provided with a central channel sleeve, a piston rod operable in said sleeve, a piston within said measuring cylinder and on said rod, said base having a duct from the reservoir to the measuring cylinder and an outlet duct from the measuring cylinder, back check valves in said ducts, means passing through said sleeve by which the piston may be elevated to supply the measuring cylinder with liquid from the reservoir, means for forcing the piston downwardly to expel the fluid from the measuring cylinder and a displacement cup on said piston rod within the reservoir, said cup having a valved passage in its bottom which is held closed when the cup is moved in one direction and opened when the cup is moved in the opposite direction.

13. In an apparatus of the character stated, a base having a chamber, a measuring cylinder secured in said chamber, a cap, a reservoir cylinder mounted between the base and cap, said cap having an opening provided with a central channel sleeve, a piston rod operable in said sleeve, a piston within said measuring cylinder and on said rod, said base having a duct from the reservoir to the measuring cylinder and an outlet duct from the measuring cylinder, back check valves in said ducts, means passing through said sleeve by which the piston may be elevated to supply the measuring cylinder with liquid from the reservoir, means for forcing the piston downwardly to expel the fluid from the measuring cylinder, said forcing means comprising a spring engaging said cap and connected with said piston rod and a displacement cup on said piston rod within the reservoir, said cup having a valved passage in its bottom which is held closed when the cup is moved in one direction and opened when the cup is moved in the opposite direction.

14. In an apparatus of the character stated, a base having a chamber, a measuring cylinder secured in said chamber, a cap, a reservoir cylinder mounted between the base and cap, said cap having an opening provided with a central channel sleeve, a piston rod operable in said sleeve, a piston within said measuring cylinder and on said rod, said base having a duct from the reservoir to the measuring cylinder and an outlet duct from the measuring cylinder, back check valves in said ducts, means passing through said sleeve by which the piston may be elevated to supply the measuring cylinder with liquid from the reservoir, means for forcing the piston downwardly to expel the fluid from the measuring cylinder, a displacement cup on said piston rod within the reservoir, said cup having a valved passage in its bottom which is held closed when the cup is moved in one direction and opened when the cup is moved in the opposite direction, and means positively to open said cup's valve as the cup reaches the lower limit of its movement.

15. In an apparatus of the character stated, a base having a chamber, a measuring cylinder secured in said chamber, a cap, a reservoir cylinder mounted between the base and cap, said cap having an opening provided with a central channel sleeve, a piston rod operable in said sleeve, a piston within said measuring cylinder and on said rod, said base having a duct from the reservoir to the measuring cylinder and an outlet duct from the measuring cylinder, back check valves in said ducts, means passing through said sleeve by which the piston may be elevated to supply the measuring cylinder with liquid from the reservoir, means for forcing the piston downwardly to expel the fluid from the measuring cylinder, said forcing means comprising a spring engaging said cap and connected with said piston rod, a displacement cup on said piston rod within the reservoir, said cup having a valved passage in its bottom which is held closed when the cup is moved in one direction and opened when the cup is moved in the opposite direction, and means positively to open said cup's valve as the cup reaches the lower limit of its movement.

16. In an apparatus of the character described, a base, a reservoir for liquid carried by the base, means within the base and reservoir for dispensing measured quantities of liquid via the base, said dispensing means including a measuring cylinder and a piston, a piston rod, mechanical means to force the piston to expel a measured charge from the measuring cylinder and manual means to operate the piston for supplying the measuring cylinder with liquid from the reservoir, said manual means including a setting rod, and an operating connection between said setting rod and said piston rod.

17. In an apparatus of the character described, a base, a reservoir for liquid carried by the base, means within the base and reservoir for dispensing measured quantities of liquid via the base, said dispensing means including a measuring cylinder and a piston, a piston rod, mechanical means to force the piston to expel a measured charge from the measuring cylinder and manual means to operate the piston for supplying the measuring cylinder with liquid from the reservoir, said manual means comprising a setting rod, means to adjust the action of said rod and an operating connection between said setting rod and said piston rod.

18. The combination of a gasoline filling tower having an outlet fitting, an oil dispenser mounted on said fitting, said dispenser having a discharge duct including a tube inserted in the fitting within the gasoline passage, the outlet end of the tube being directed in the direction of flow of the gasoline.

19. A combination of a gasoline filling tower having an outlet, a pipe T secured to said outlet, a discharge hose secured to said pipe T in alignment with the said outlet, an oil dispenser having a neck secured to said T and provided with a discharge duct delivering into the T in the direction of flow of the gasoline through the tee from the tower, said dispenser including a reservoir and means to dispense measured quantities of fluid from said reservoir through said neck.

ALBERT I. BABENDREER.
WILLIAM F. DALE.